Jan. 10, 1967  D. ENGELSMANN ET AL  3,296,947
DEVICES FOR MAKING EXPOSURES WITH ARTIFICIAL LIGHT
Filed July 27, 1964  4 Sheets-Sheet 1

INVENTOR.
DIETER ENGELSMANN
BY  ALFRED BRÄTH

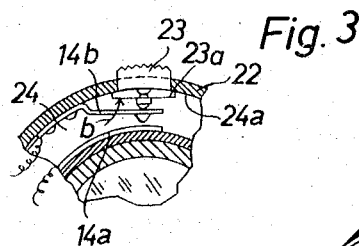
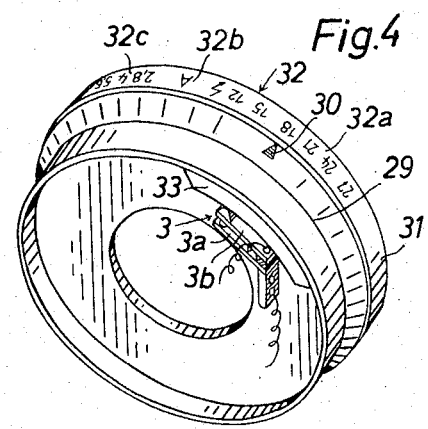

United States Patent Office 3,296,947
Patented Jan. 10, 1967

3,296,947
DEVICES FOR MAKING EXPOSURES WITH ARTIFICIAL LIGHT
Dieter Engelsmann and Alfred Bräth, Unterhaching, near Munich, Germany, assignors to Agfa Aktiengesellschaft, Leverkusen, Germany
Filed July 27, 1964, Ser. No. 385,144
Claims priority, application Germany, July 26, 1963, A 43,691
10 Claims. (Cl. 95—1)

The present invention relates to photographic devices.

In particular, the present invention relates to photographic devices capable of making photographic exposures with artificial illumination.

Thus the present invention can be incorporated into still or motion picture cameras which have objectives which include adjustable diaphragm and focusing adjustments for setting the distance between the photographic device and the subject which is to be photographed and which also have units capable of providing artificial illumination either built into or detachably connected with the photographic device.

A primary objective of the present invention is to provide a device of the above type which is of an exceedingly simple construction.

A further important object of the present invention is to provide a structure of the above type which is capable of making exposures with artificial illumination without, however, requiring the operator to take any special steps such as those presently required with conventional photographic devices which are capable of making exposures with artificial illumination.

In particular it is an object of the invention to provide a structure which, for the purpose of making exposures with artificial illumination, requires the operator only to make settings according to the distance between the subject and the photographic device and the film speed.

It is furthermore an object of the present invention to provide a structure which will respond automatically to changes of either of these two settings, namely the setting of the speed of the film which is exposed and/or the setting of the distance between the photographic device and the subject which is to be photographed, for changing the intensity of the illumination so as to provide proper exposures and thus avoid the disadvantage of improper exposures resulting from forgetfulness on the part of the operator with respect to adjustments which should be made, as required with conventional devices, when setting changes of the above type are made.

It is in particular an object of the invention to provide a structure which is suitable for use with a device where the artificial illumination is derived from an electronic flash unit, although the invention is not necessarily limited to this specific type of illuminating structure.

Furthermore, it is an object of the invention to provide a device which, when the operator selectively changes it from a condition for making exposures with daylight illumination to a condition for making exposures with flash illumination, will automatically close a switch of an electrical circuit which includes a source of current so that the operator is not required to remember to connect a source of current to the circuit.

Still another object of the present invention is to provide a structure which can carry out the above objects involving adjustments of the intensity of the illumination provided by the illuminating structure in an electrical manner.

Also, it is an object of the invention to provide a purely mechanical means for varying the intensity of the illumination provided by the illuminating structure.

With the above objects in view the invention includes, in a device for making photographic exposures with artificial illumination, an illuminating means for artificially illuminating a subject which is to be photographed. A regulating means is operatively connected to this illuminating means for regulating the intensity of the illumination provided thereby. An objective assembly forms part of the device and includes a focusing means for setting into the device the distance between the subject and the device, and the objective assembly also includes a diaphragm-adjusting means for adjusting the exposure aperture. With the structure of the invention, this focusing means is operatively connected to the regulating means for actuating the latter to regulate the light intensity of the illuminating means according to the distance set into the device by the focusing means. The structure of the invention also includes a scale of film speeds which is operatively connected with the diaphragm-adjustings means for setting the latter, not according to a selective aperture, but rather according to the speed of the film which is exposed, so that when making exposures with artificial illumination the size of the exposure aperture will be determined directly from the speed of the film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 3 is a fragmentary sectional view, taken in a plane normal to the optical axes, this plane passing through the focusing structure of the objective assembly of FIG. 1 and illustrating switch structure which is automatically actuated in response to a change in the setting of the objective;

FIG. 4 is a perspective illustration of the diaphragm-adjusting structure of the objective assembly of FIG. 1, FIG. 4 further illustrating switch structure which is automatically actuated in response to operation of the diaphragm setting structure;

FIG. 5 is a fragmentary, partially sectional and partly diagrammatic top plan view of a second embodiment of the invention which is capable of regulating the intensity of the artificial light in a mechanical, rather than an electrical, manner;

Figure 1:
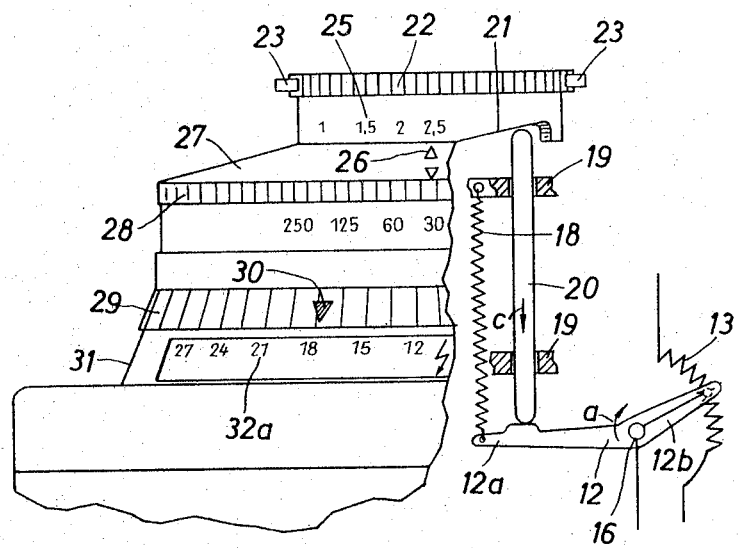
FIG. 1 is a fragmentary top plan view of an objective assembly of the invention, as it appears when looking at the exterior thereof, FIG. 1 also indicating how the light intensity is electrically regulated in response to setting of a focusing means of the objective assembly.

For a clear understanding of the principles on which the structure of the invention is based, the following relationships should be considered:

(1) $L = B.E$ (2) $L_2 = \sqrt{2.L}.\sqrt{n/3}$

In these equations, L indicates the guide number, $L_2$ indicates the guide number which is to be found for a film of greater sensitivity (film speed), B indicates the exposure aperture, E indicates the distance, in meters, between the flash device and the subject which is to be photographed, and $n$ indicates the film speed differential, according to the DIN scale, between the film of higher sensitivity and the film for which the guide number is known.

From Equation 2 it follows that when using a film which is more sensitive by 6 DIN than the other film for which the guide number is known the guide number will be doubled. A doubling of the guide number requires, however, as is apparent from Equation 1, that the diaphragm be stopped down through two stops if the distance between the subject and the camera remains constant. It follows, therefore, that when using a scale of film speeds whose graduations differ from one to the next by 3 DIN, there will be a predetermined diaphragm setting for each film speed value. From these relationships it is possible, for example, to provide the following series of film speeds and diaphragm settings which respectively correspond thereto:

| Film speed in DIN: | 12 | 15 | 18 | 21 | 24 | 27 |
|---|---|---|---|---|---|---|
| Diaphragm settings: | 2.8 | 4 | 5.6 | 8 | 11 | 16 |

From these considerations it follows, as is apparent from Equation 1, that the flash guide number with the structure of the invention is merely a function of the distance between the subject and the camera, inasmuch as the exposure aperture remains constant for the particular film which is in the camera. The light intensity need only be controlled, therefore, in acordance with the distance between the photographic device and the subject which is to be photographed. If this distance is halved, for example, the guide number will be halved, and the intensity of the light derived from the artificial illuminating means will be correspondingly diminished.

The embodiment of the illustration which is illustrated in FIGS. 1–4 includes a camera which has a built in electronic flash unit. This electronic flash unit is electrically connected into the circuit 1, shown in FIG. 2, which includes the source of current 2 which can, for example, take the form of one or more batteries or miniature storage batteries, and the circuit also includes an interruptor switch 3. The circuit 1 is electrically connected through a transformer 4 with the flash circuit 5. In this flash circuit 5 are the flash lamp 6, which is the source of artificial light, a flash capacitor 7, and ignition capacitor 8, and an ignition coil 9. Furthermore, the flash circuit 5 includes a switch 10 which is actuated in synchronism with and by the shutter of the camera so as to provide the flash when the shutter is open, as is well known in the art. This basic flash circuit 5 is in itself well known, as thus far described, and does not form part of the invention.

In order to control the intensity of the light which is provided by the lamp 6, a fixed resistor 11 and a variable resistor 13, which includes a slider 12, are connected in parallel with the flash capacitor 7. According to the setting of the variable resistor 13, the capacitor 7 will be provided with a given charge, so that by changing the setting of the variable resistor 13 it is possible to vary the charge of the capacitor 7. In this way the light provided by the lamp 6 at the instant of ignition can be regulated, so that the variable resistor 13 forms a regulating means capable of regulating in an electrical manner the intensity of the light provided by the illuminating means 6.

Instead of a single capacitor 7, it is also possible to provide a plurality of these capacitors and to charge only a predetermined number thereof as required to achieve light of a given intensity.

Furthermore, the flash circuit 5 includes, in parallel with the capacitor 7, a further interruptor switch 14 which is in series with a fixed resistor 15. When the switch 14 is closed, the charged capacitor 7 will discharge through the resistor 15 without igniting the flash lamp 6.

Figure 2:
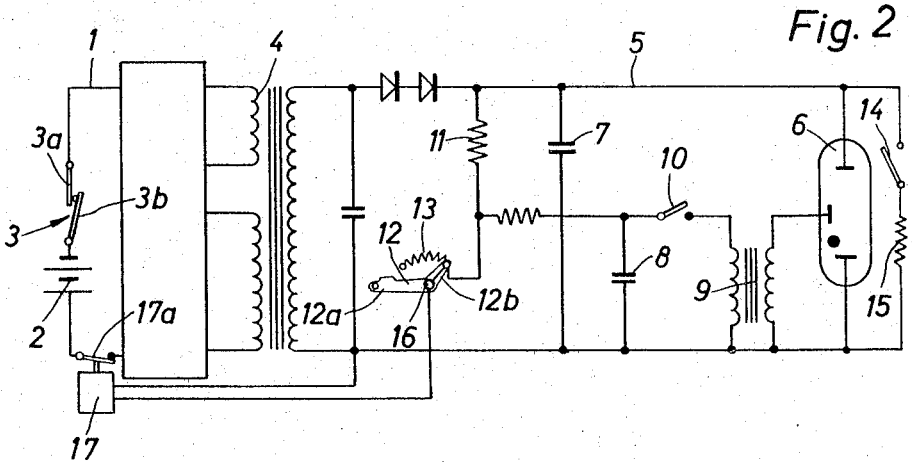
FIG. 2 is a wiring diagram of an electrical circuit capable of being used with the structure of FIG. 1.

The slider 12 of the variable resistor 13 is in the form of a lever having two arms 12a and 12b and supported for turning movement about a stationary pivot 16, as shown diagrammatically in FIGS. 1 and 2. The arm 12b engages the resistor and is connected through a suitable conductor with a known switch controlling amplifier 17 which automatically opens the supply circuit 1, by opening the switch 17a thereof, when the capacitor 7 has received a predetermined charge.

Referring to FIG. 1, it will be seen that the end of the arm 12a which is distant from the resistor is connected to one end of a spring whose other end is fixed to a stationary element so that the slider 12 is urged to turn in the direction of the arrow $a$ shown in FIG. 1. In this way a portion of the arm 12a will remain in engagement with one end of an elongated, motion-transmitting rod 20 supported for longitudinal movement by a pair of stationary bearings 19 and pressing at its other end against a camming surface 21 of the rotary focusing means 22 of the objective assembly shown in FIG. 1, this focusing means setting into the photographic device the distance between the device and the subject which is to be photographed.

The focusing means 22 includes, as shown in FIGS. 1 and 3, a pair of finger pieces 23 which must be engaged and depressed inwardly toward the optical axis by the operator in order to turn the rotary focusing means 22. In the interior of the focusing means 22 there is behind one of the finger pieces 23 a hollow space 24 in which the interruptor switch 13 is situated. This switch 14 includes a contact strip 14a which is stationary with respect to the focusing means in that it can only turn therewith and a contact spring 14b which not only turns with the focusing means 22 but which in addition can be deflected toward and into engagement with the strip 14a for closing the switch 14. This switch 14 is connected through flexible conductors or slip rings with the flash circuit 5.

The springy contact 14b, due to its inherent resiliency, seeks to turn in the direction of the arrow $b$ shown in FIG. 3. Therefore, the resiliency of this springy contact 14b assures that in its rest position the switch 14 is open and that the finger-piece 23 shown in FIG. 3 will be maintained, when it is not depressed by the operator, with its inner end projections 23a engage the interior surface 24a of the focusing means 22 which forms the outer limit of the hollow space 24.

In addition, in order to improve the fault-free operation of the structure a lock assembly of known construction can be provided between the focusing means 22 and a stationary part of the objective assembly, the depression of the finger-pieces 23 releasing this lock means so that the focusing means 22 can be turned only by depression of the finger-pieces 23. The exterior of the focusing means 22 carries a scale 25 of distances, in meters in the example shown in FIG. 1, and this scale cooperates with an index 26 carried by a stationary exterior ring 27 of the objective assembly.

Coaxially arranged with respect to the rotary focusing means 22 are an exposure time setting ring 28 and a rotary aperture setting ring 29 which forms a diaphragm-adjusting means of the structure of the invention. The diaphragm-adjusting means 29 carries an index 30, and operatively connected with the diaphragm-adjusting means 29 is a scale 32 which is stationary and mounted on a fixed covering ring 31 of the objective assembly, so that when the ring 29 is turned by the operator the index 30 will move along the scale 32 which is shown most clearly in FIG. 4. This scale 32 is, in the illustrated example, divided into three adjusting ranges 32a, 32b and 32c. The adjusting range 32a has a symbol indicating exposures with flash illumination and this portion of the scale 32 is provided with a series of film speed graduations. The intermediate range 32b of the scale 32 is provided with a symbol A indicating the setting to be made for automatic exposure control, and the range 32c has a symbol indicating daylight exposures with manual diaphragm settings, this part of the scale carrying a series of stop numbers. With cameras which do not have the automatic exposure controlling structure the intermediate section 32b will be omitted. When setting the camera for exposure with artificial illumination the index 30 is aligned with a graduation of the film speed scale at the range 32a, while when making an exposure with daylight illumination, either with automatic exposure control or with manual settings the index 30 will be aligned with the ranges 32b or 32c. The connection of the adjusting ring 29 to the diaphragm itself as well as to the automatic exposure controlling structure is in itself well known e.g., from U.S. Patent 3,056,340 and forms no part of the present invention, so that these features are not illustrated.

As may be seen from FIG. 4, the rotary diaphragm-adjusting ring 29 carries at its interior a cam 33 which turns with the ring 29. When the index 30 is at the range 32a of the scale 32 the cam 33 will be in engagement with the interrupter switch 3 and will close the latter. The interrupter switch 3 includes a stationary contact plate 3a and a deflectable contact spring 3b which seeks to assume a position spaced from the plate 3a so as to maintain the switch open. When the cam 33 engages the springy contact 3b, however, as is the case when the index 30 is at any part of the scale range 32a, this cam 33 maintains the springy contact 3b deflected in opposition to its inherent resiliency to a position where it engages the contact 3c, and thus the switch 3 is automatically closed whenever the operator sets the camera to provide exposures with artificial illumination. Thus, the ring 29 in addition to forming a diaphragm-adjusting means also forms a selecting means for selecting a particular type of camera operation.

In order to make an exposure with flash illumination, the focusing means 22 is adjusted, after depressing the finger-pieces 23, until it is set at the required distance between the camera and the subject to be photographed, this setting being determined by aligning a selected graduation of the scale 25 with the stationary index 26. The turning of the focusing means 22 will of course result in movement of the cam 21 with respect to the rod 20 so that the latter will shift longitudinally either in the direction of or opposite to the direction of the arrow c shown in FIG. 1. The result will of course be a turning of the slider 12 in or opposite to the direction indicated by the arrow a. In this way the magnitude of the variable resistor 13 is adjusted automatically in accordance with the setting of the focusing means 22. Then the diaphragm-adjusting means 29 is turned until its index 30 is aligned with that graduation of the scale range 32a which corresponds to the speed of the film which is in the camera. This adjustment will of course result in closing of the switch 3 by the cam 33, so that the supply circuit 1 is closed without requiring the operator to make sure that the source of current is properly connected with the flash apparatus. As a result current will flow in the circuit 1, in the transformer 4 and in the flash circuit 5. By the parallel connection of the flash capacitor 7 with the variable resistor 13 which is connected to the output of the transformer 4 the charging of the capacitor 7 will be limited in accordance with the setting of the focusing means 22, and of course the switch 17a will automatically open when the capacitor 7 has been charged to an extent determined by the setting of the focusing means 22. Of course, there is nothing critical about the above sequence of operations. For example, the diaphragm-adjusting means can be set before the focusing means is adjusted.

An unillustrated shutter release is available to the operator for tripping the shutter so as to make the exposure and of course, the tripping of the shutter will result in closing of the switch 10 so that in a known way the lamp 6 will be ignited and the capacitor 7 will discharge.

Immediately after the capacitor 7 has discharged it will begin to be recharged. If the next exposure is to be made with artificial illumination but of a subject situated at a different distance from the camera, then the finger-pieces 23 are depressed and the focusing means is adjusted to the new distance. As a result the interrupter switch 14 is closed so that the capacitor will discharge and will not be recharged for the duration of the adjustment of the focusing means 22. Only after the adjustment of the focusing means is completed, and thus after the variable resistor 13 has been adjusted to a new resistance, can a new charge of the capacitor 7 take place. These measures are provided with the invention because if the distance between the subject and the camera is reduced, the capacitor 7 may have a charge which will provide too much light for the new distance between the subject and the camera.

If the structure for making exposures with artificial illumination is built in such a way that only the current supply circuit 1 together with the source 2 and perhaps the transformer 4 are detachably connected with the camera, while the flash lamp circuit 5 forms an integral part of and is built into the camera, then the above-described construction need not be changed in any way. However, if the structure for providing exposures with artificial illumination includes one or more housings to be attached to the camera, then, for example, the rod 20 can act on the end of a two-arm motion-transmitting lever which is turnably supported by the camera and which has its end distant from the rod 20 engageable with the free end of the arm 12a when the housing which carries the flash circuit is mounted on the camera so that in this way motion can be transmitted with such an assembly from the rod 20 to the variable resistor 13.

With the embodiment of the invention which is illustrated in FIG. 5, the camera also has a built-in electronic flash unit. In this case the camera housing carries a reflector 40 which reflects the light derived from the flash lamp 41. Further connections of the electronic flash unit can have any known construction and therefore are not further illustrated. In front of the artificial illuminating means 41 is a light-blocking means which has the property of at least partly preventing light from passing therethrough, and in the illustrated example, this light-blocking means includes a plurality of light-blocking elements in the form of gray filters of equal density having the construction of simple plates which are supported for turning movement relative to each other about parallel axes, respectively, in the directions d and e indicated in FIG. 5. In order to transmit rotary motion to the filter plates 42–45, these plates are respectively rigidly fixed with pinions 46–49 the axes of which respectively coincide with the turning axes of the light-blocking elements 42–45. Along these turning axes there are unillustrated pins extending downwardly from the pinions and upwardly from the filter plates, and these pins are respectively received in stationary bearings of the camera, so that in this way a support means is provided to support the light-blocking means 42–45 for movement to positions covering the illuminating means 41 to different extents. Each of the light-blocking plates 42–45 extends throughout the entire height of the reflector 40.

In order to transmit movement to the pinions 46–49, there is situated at the elevation of these pinions a drive member 50 which is linearly shiftable in or in opposition to the direction of the arrow f. The drive member 50 is formed with elongated slots 51 which receive stationary pins 52 for guiding the member 50 for longitudinal movement. This drive member 50 has an elongated slot which receives the several pinions and edge portions of this slot are in the form of racks 71–74 which respectively mesh with the pinions 46, 48, 47 and 49, so that during longitudinal shifting of the member 50 the light-blocking elements 42–45 are turned in pairs in such a way that elements 42 and 43 will simultaneously turn in opposite directions and elements 44 and 45 will simultaneously turn in opposite directions, elements 42 and 44 turning in the same direction and elements 43 and 45 turning in the same direction. A spring 53 is connected at one end to the member 50 and at its opposite end to a stationary part of the camera so as to urge the member 50 to move in a direction opposite to that indicated by the arrow $f$. This spring 53 serves to maintain a follower pin 54, which is fixed to the member 50, in engagement with the camming surface of a rotary cam 55. This cam 55 is coaxially fixed with a pinion 56 and is supported therewith for turning movement by a stationary pin 57 which extends perpendicularly to the optical axis in a vertical direction. The pinion 56 meshes with a rack 58 forming part of an elongated rod 60 supported for longitudinal movement in or in opposition to the direction indicated by the arrow $g$ by a bearing 59, which, however, prevents the rod 60 from turning about its axis. A spring 61 is fixed at one end to the rod 60 and at its opposite end to a stationary element so as to urge the rod 60 in the direction of the arrow $g$, and thus the front end of the rod 60 is maintained in engagement with the cam 62 of the focusing means 63 of the embodiment of FIG. 5. The focusing means 63 has a scale 64 of distances in meters, and this scale cooperates with the stationary index 65.

When making exposures with artificial illumination with this structure which can be divided into one or more units which are attachable to and detachable from the camera, the shaft 57 for example can be divided into a pair of shaft sections which are automatically coupled to each other when the structure for providing the artificial illumination is attached to the camera. One of the shaft sections will thus be supported for rotation of the camera and remains operatively connected with the focusing means, while the other shaft section is carried by the unit which carries the light source and reflector, this other shaft section being operatively connected with the structure for controlling the light intensity.

In the same way as was described above in connection with FIGS. 1–4, the objective assembly of FIG. 5 includes an exposure time setting means 66 and a diaphragm-adjusting means 67 which is provided with the index 68 which during exposures with artificial illumination cooperates with the scale region 69 carried by the stationary closure ring 70 and carrying a series of film speed graduations. This ring 70, as was the case with the embodiment of FIGS. 1–4, can carry further scale ranges for providing adjustments during daylight exposure or exposure with automatic exposure controls. The inner periphery of the diaphragm-adjusting means 67, in the same way as the diaphragm-adjusting means 29 of FIG. 4, carries a cam 33 for closing the interrupter switch of the current supply circuit of the structure for providing the artificial illumination.

In order to make an exposure with the built-in artificial illuminating construction the diaphragm-adjusting means is turned until its index 68 is aligned with that graduation of the scale 69 which corresponds to the speed of the film which is in the camera. In this way, as was the case with the embodiment of FIGS. 1–4, the diaphragm is set to provide an exposure aperture which corresponds to the speed of the film. Then the focusing means 63 is turned to align with the index 65 a graduation of the scale 64 corresponding to the distance between the camera and the subject to be photographed. As a result the cam 62 will alter the longitudinal position of the rod 60, with the result that the pinion 56 and the cam 55 will turn. The rotary movement of the cam 55 results in longitudinal shifting of the turning means 50. If this means 50 is shifted in the direction of the arrow $f$, the racks 71 and 72 will turn the light-blocking elements 42 and 44 in the direction of the arrow $d$ and the racks 73 and 74 will turn the light-blocking elements 43 and 45 in the direction of the arrow $e$. As a result the lamp 41 is covered to an increasing extent. The structure can be designed so that, as shown in dot-dash lines, in an end position the lamp 41 is completely covered by the light-blocking means. Thus, the extent to which the illuminating means 41 of FIG. 5 is covered, and thus the light intensity, will depend upon the setting of the focusing means 63.

Of course, instead of using light-blocking elements in the form of gray wedges, it is possible to use light-blocking elements which are completely impervious to the passage of light, but in this case the end position where the light is reduced to a minimum should be one where the lamp 41 still remains partially uncovered. Thus, in this case the light-blocking elements will not engage each other at the end position which provides minimum illumination. Of course, the structure of adjusting the light intensity can take the form of a series of gray filters of different densities capable of being shifted either individually or in combination in front of the light source. Also, the use of other known light-blocking structure is possible. Also, as was indicated above, the invention is not limited to the use of an electronic flash unit as the source of artificial illumination.

It is believed to be apparent that in both of the above-described embodiments of the invention an exceedingly compact and simple structure has been provided.

Figure 6:
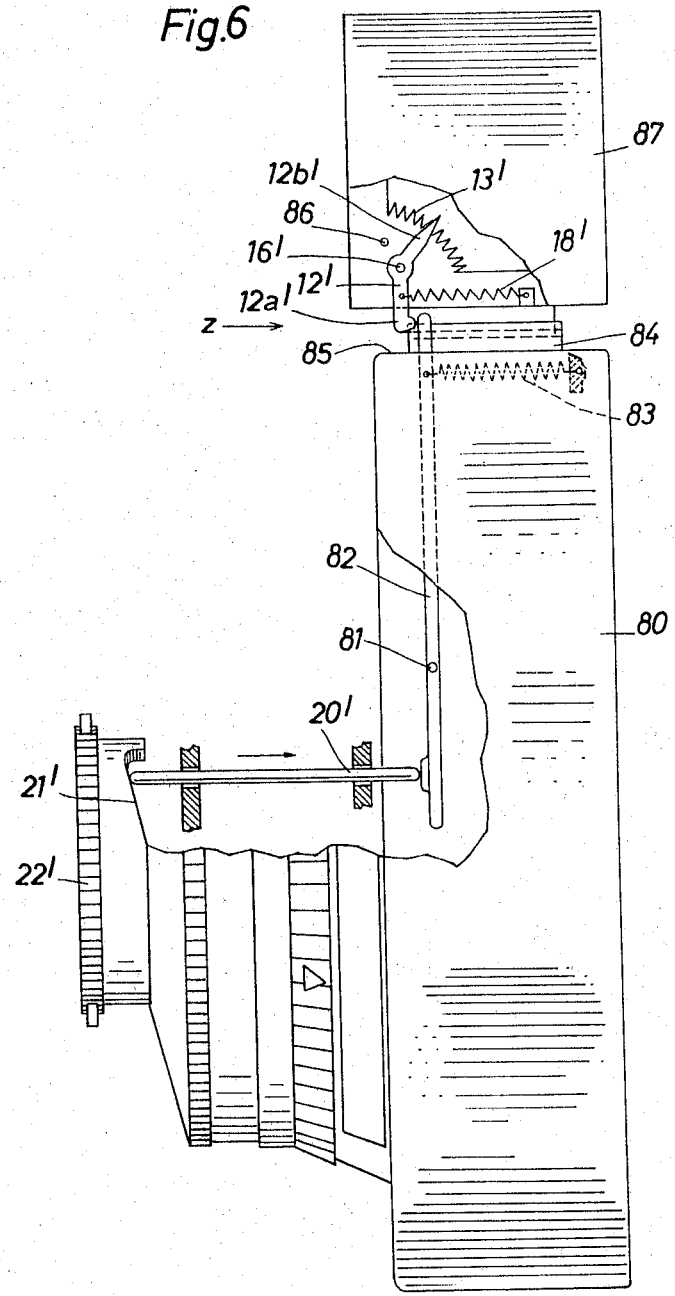
FIG. 6 is a fragmentary elevation of an arrangement according to the invention in which a camera is combined with a separate electronic flash light device.

FIG. 6 illustrates an arrangement according to the invention which constitutes a combination of a camera 80 with a reparate electronic flash light device 87. Generally the details of the arrangement are similar to the ones described above. In the arrangement according to FIG. 6 the control rod 20' is controllable by the cam 21' of the focusing means 22' and acts on the end of a transmitting lever 82 which is pivotally supported by a pin 81 mounted in the camera. The other end of the lever 82 which is continuously urged by a spring 83 into engagement with the control rod 20' extends through the upper face 85 of the camera adjacent to projecting attachment holder 84. The electronic flash light device 87 having a corresponding attaching device may be fixed on the camera 80 by pushing the two members of the attachment arrangement into engagement as indicated by the arrow $z$.

Within the electronic flash light device 87 a contact arm 12' is turnably supported by a fixed pivot 16 prime and is continuously urged by a spring 81' toward engagement with a stop pin 86. The contact arm 12' is constructed as a two-arm lever whose portion 12b' cooperates with a resistor 13' that corresponds to the resistor 13 of FIG. 2. The other portion 12a' projects through an opening at the lower face of the device 87. Consequently when the device 87 is moved into the illustrated position as indicated by the arrow $z$ the end of the portion 12a' will abut against the outer end of the transmission lever 82. Hereby the setting of the contact arm 12' is effected in such a manner that its setting corresponds to the distance for which the focusing device 22' is set.

From the above it can be seen that the invention can be incorporated also in an embodiment where in the flash light device is a separate unit attachable to the camera.

Figure 7:
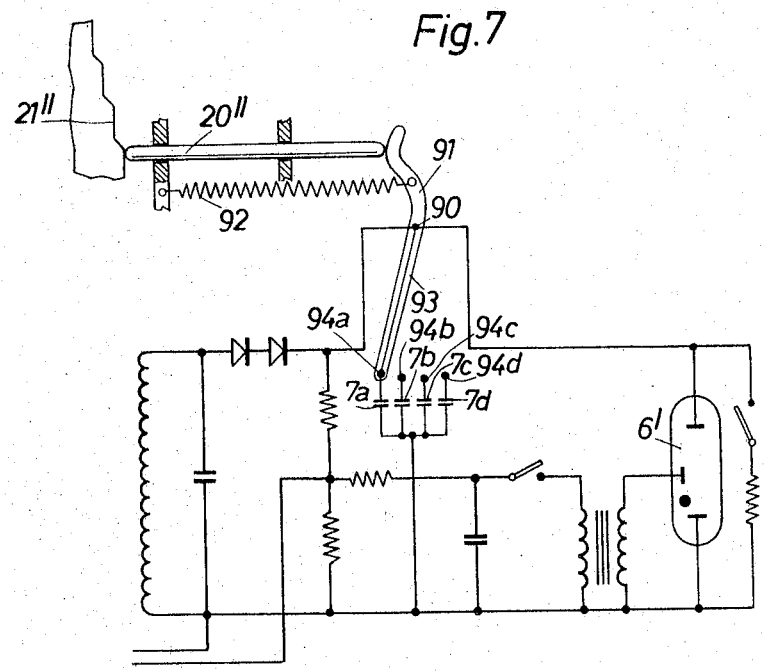
FIG. 7 is a diagrammatic illustration of a modification of the arrangement of FIG. 2.

FIG. 7 shows that under certain circumstances a modification of the circuit arrangement according to FIG. 2 may be used to advantage. As can be seen from FIG. 7 which generally corresponds to FIG. 2 but also incorporates some of the control devices illustrated by FIG. 1 the single flash capacitor 7 is replaced by a plurality of capacitors 7a, 7b, 7c and 7d which differ from each other by having different capacities.

FIG. 7 shows that any one of the capacitors 7a–7d are connected in parallel with each other, each having a terminal 94a–94d, respectively. A two-arm switch lever 91 pivotally supported by a pin 90 is moveable between a plurality of position in each of which the outer end of the conducting portion 93 of the arm 91 engages a different one of the capacitor terminals 94a–94d. The inner end of the conductive portion 93 is conductively connected at the point 90 with the circuit 5' as shown. The opposite end of the arm 91 is held by a spring 92 in engagement with the outer end of the above mentioned control rod 20' which, at its opposite end, is in engagement with the cam 21'' of a focusing device of the type described above. The cam 21'' may be formed with steps as illustrated so that in any one of the various positions of the focusing device the switch arm 91 will always be caused to assume the proper position for connecting the circuit 5' with the respectively required capacitor.

It will be understood that each of the elements described above, or two or more together, may also find a useful application in other types of cameras differing from the types described above.

While the invention has been illustrated and described as embodied in devices for making exposures with artificial illumination, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for making photographic exposures with artificial illumination, in combination, illuminating means for artificially illuminating a subject which is to be photographed; regulating means operatively connected to said illuminating means for regulating the intensity of the illumination provided thereby; an objective assembly including focusing means for setting into the device the distance between the subject and the device and diaphragm-adjusting means for adjusting the exposure aperture, said focusing means being operatively connected to said regulating means for actuating the latter to regulate the light intensitty of said illuminating means according to the distance set by said focusing means, said diaphragm-adjusting means being adjustable through at least two ranges, one of which provides adjustment for daylight exposures and the other of which provides adjustments for exposures with artificial illumination; and a scale of film speeds operatively connected with said diaphragm-adjusting means and cooperating therewith when the latter is in the other of said ranges for setting said diaphragm-adjusting means according to the speed of the film which is exposed.

2. In a device as recited in claim 1, said illuminating means being electrical and said device including an electrical circuit in which said illuminating means is located, said regulating means being operatively connected to said circuit for regulating the light intensity of said illuminating means according to the setting provided by said focusing means.

3. In a device according to claim 1, said illuminating means including an electronic flash unit including a lamp, an electrical circuit operatively connected to said lamp and including at least one flash capacitor, said regulating means being operatively connected to said capacitor for regulating the extent to which the latter is charged so as to regulate the intensity of the illumination provided by said lamp.

4. In a device as recited in claim 3, said regulating means being a variable resistor electrically connected to said capacitor and operatively connected to said focusing means to be adjusted thereby.

5. In a device according to claim 1, said illuminating means including flash means for providing the artificial illumination; an electrical circuit operatively connected to said flash means and including a flash capacitor connected electrically with said flash means and a resistor and switch in series with each other and with said capacitor for discharging the latter with said resistor when said switch is closed, said regulating means operatively connected to said capacitor for regulating the extent to which the latter is charged so as to adjust the intensity of the illumination provided by said flash means, said focusing means being operatively connected to said switch for closing the latter so as to discharge said capacitor through said resistor whenever said focusing means is actuated to change the setting of the distance between the subject and the device.

6. In a device for providing photographic exposures with artificial illumination, in combination, illuminating means for artificially illuminating a subject which is to be photographed; light-blocking means situated in front of said illuminating means, said light-blocking means at least partially preventing light from passing therethrough; support means supporting said light-blocking means for movement with respect to said illuminating means to positions covering the latter to different extents for varying the intensity of the light with which a subject is illuminated by said illuminating means; an objective assembly including focusing means for setting into the device the distance between the subject to be photographed and the device, said focusing means being operatively connected to said light-blocking means for moving the latter to a position covering said illuminating means to an extent providing an intensity of illumination determined by the setting of said focusing means, said objective assembly also including a diaphragm-adjusting means; and a scale of film speeds operatively connected with said diaphragm-adjusting means for setting the latter according to the speed of the film which is exposed.

7. In a device as recited in claim 6, said light-blocking means including a plurality of light-blocking elements each of which at least partially prevents light from passing therethrough, said support means supporting said elements for turning movement respectively about parallel axes with respect to said illuminating means for covering the latter to different extents, and turning means operatively connected to said plurality of elements for respectively turning the latter about said axes, said turning means being operatively connected to said focusing means to be actuated thereby.

8. In a device for making photographic exposures with artificial illumination, in combination, illuminating means for artificially illuminating a subject which is to be photographed; regulating means operatively connected to said illuminating means for regulating the intensity of the illumination provided thereby; an objective assembly including focusing means for setting into the device the distance between the subject and the device and diaphragm-adjusting means for adjusting the exposure aperture, said focusing means being operatively connected to said regulating means for actuating the latter to regulate the light intensity of said illuminating means according to the distance set by said focusing means, said regulating means being situated in front of said illuminating means for blocking the light issuing therefrom to an extent determined by the setting of said focusing means; and a scale of film speeds operatively connected with said diaphragm-adjusting means for setting the latter according to the speed of the film which is exposed.

9. In a device for photographic exposures with artificial illumination, in combination, flash means for providing the artificial illumination; an electrical circuit operatively connected to said flash means and including a flash capacitor connected electrically with said flash means and a resistor and switch in series with each other and with said capacitor for discharging the latter with said resistor when said switch is closed; regulating means operatively connected to said capacitor for regulating the extent to which the latter is charged so as to adjust the intensity of the illumination provided by said flash means; an objective assembly including a focusing means operatively connected to said regulating means for actuating the latter to adjust the extent to which said capacitor is charged according to the distance between the subject to be photographed and the device set into the latter by said focusing means, said focusing means being operatively connected to said switch for closing the latter so as to discharge said capacitor through said resistor whenever said focusing means is actuated to change the setting of the distance between the subject and the device, said objective assembly also including a diaphragm-adjusting means for adjusting the size of the exposure aperture; manually operable means operatively connected to said switch for closing the latter and operatively connected to said focusing means for preventing operation of the latter unless said manually operable means is actuated to close said switch; and a scale of film speeds operatively connected to said diaphragm-adjusting means for setting the latter according to the speed of the film which is exposed.

10. In a device for making photographic exposures, in combination, illuminating means for providing artificial illumination of a subject which is to be photographed; manually operable selecting means for selectively setting the device to provide exposures with artificial illumination; an electrical circuit operatively connected to the said illuminating means for energizing the latter, said circuit including a source of current and a switch for closing and opening said circuit, said selecting means being operatively connected to said switch for automatically closing the latter when said selecting means is set to provide operation of the device with artificial illumination; regulating means operatively connected to said illuminating means for regulating the intensity of light with which the subject is illuminated; an objective assembly including focusing means for setting the device according to the distance between the subject and the device, said focusing means being operatively connected to said regulating means for actuating the latter to regulate the light intensity according to the distance between the subject and the device which is set by said focusing means, said objective assembly also including a diaphragm-adjusting means for adjusting the size of the exposure aperture, said diaphragm-adjusting means being adjustable through at least two ranges one of which provides adjustments for daylight exposures and the other of which provides adjustments for exposure with artificial illumination; and a scale of film speeds operatively connected to said diaphragm-adjusting means for setting the latter according to the speed of the film which is exposed, said scale of film speeds cooperating with said diaphragm-adjusting means when the latter is in the other of said ranges.

References Cited by the Examiner
UNITED STATES PATENTS

| | | | |
|---|---|---|---|
| 2,901,671 | 8/1959 | Mast | 95—11.5 X |
| 2,926,579 | 1/1960 | Gebele | 95—45 |
| 3,087,398 | 4/1963 | Greger | 95—11.5 |

JOHN M. HORAN, *Primary Examiner.*